United States Patent
Babich

(10) Patent No.: US 7,113,385 B2
(45) Date of Patent: Sep. 26, 2006

(54) METHOD OF CONTROLLING MAGNETIC FLUX OF ELECTROMAGNET, AND ELECTROMAGNET IMPLEMENTING THE SAME

(75) Inventor: Nikolai Babich, Kiyv (UA)

(73) Assignee: SPB United, Inc., NJ (US)

( * ) Notice: Subject to any disclaimer, the term of this patent is extended or adjusted under 35 U.S.C. 154(b) by 498 days.

(21) Appl. No.: 10/192,523

(22) Filed: Jul. 11, 2002

(65) Prior Publication Data

US 2004/0008468 A1   Jan. 15, 2004

(51) Int. Cl.
*H01H 47/00* (2006.01)

(52) U.S. Cl. .................. 361/160; 361/170; 361/154; 361/210

(58) Field of Classification Search .......... 361/160, 361/152, 154, 170, 210, 167, 206, 144, 145
See application file for complete search history.

(56) References Cited

U.S. PATENT DOCUMENTS

| | | | |
|---|---|---|---|
| 3,458,769 A | | 8/1968 | Stampli |
| 5,818,680 A | * | 10/1998 | Schmitz et al. ............. 361/160 |
| 6,081,413 A | * | 6/2000 | Schmitz et al. ............. 361/160 |
| 6,208,497 B1 | * | 3/2001 | Seale et al. ................. 361/160 |
| 6,246,561 B1 | * | 6/2001 | Flynn ......................... 361/147 |
| 6,366,441 B1 | * | 4/2002 | Ozawa et al. ............... 361/170 |
| 6,400,549 B1 | * | 6/2002 | Davis et al. ................ 361/144 |

FOREIGN PATENT DOCUMENTS

WO   WO 00/48207   8/2000

* cited by examiner

*Primary Examiner*—Anthony Dinkins
(74) *Attorney, Agent, or Firm*—I. Zborovsky

(57) ABSTRACT

For controlling a magnetic flux of an electromagnet with a relay pulling characteristic and at least two stabile levels of values of a magnetic flux in a magnetic guide, controlling pulses of electric current are supplied into a winding of a magnetizing coil with obtaining a pulling force of a moving part of a magnetic guide of the electromagnet at least with one air gap, wherein the magnetic guide is formed at least partially of a magnetically hard material, two short-term pulses having an opposite polarity are supplied into the magnetizing coil on the magnetic guides of the electromagnet, for closing a magnetic circuit and minimization of magnetic resistance of the magnetic guide due, and holding or attracting force is provided until a supply of a second controlling pulse of electric current of the opposite polarity transferring the magnetic guide into a second stabile condition. Also, an electromagnet is proposed for an electromagnetic drive of an executing device.

16 Claims, 5 Drawing Sheets

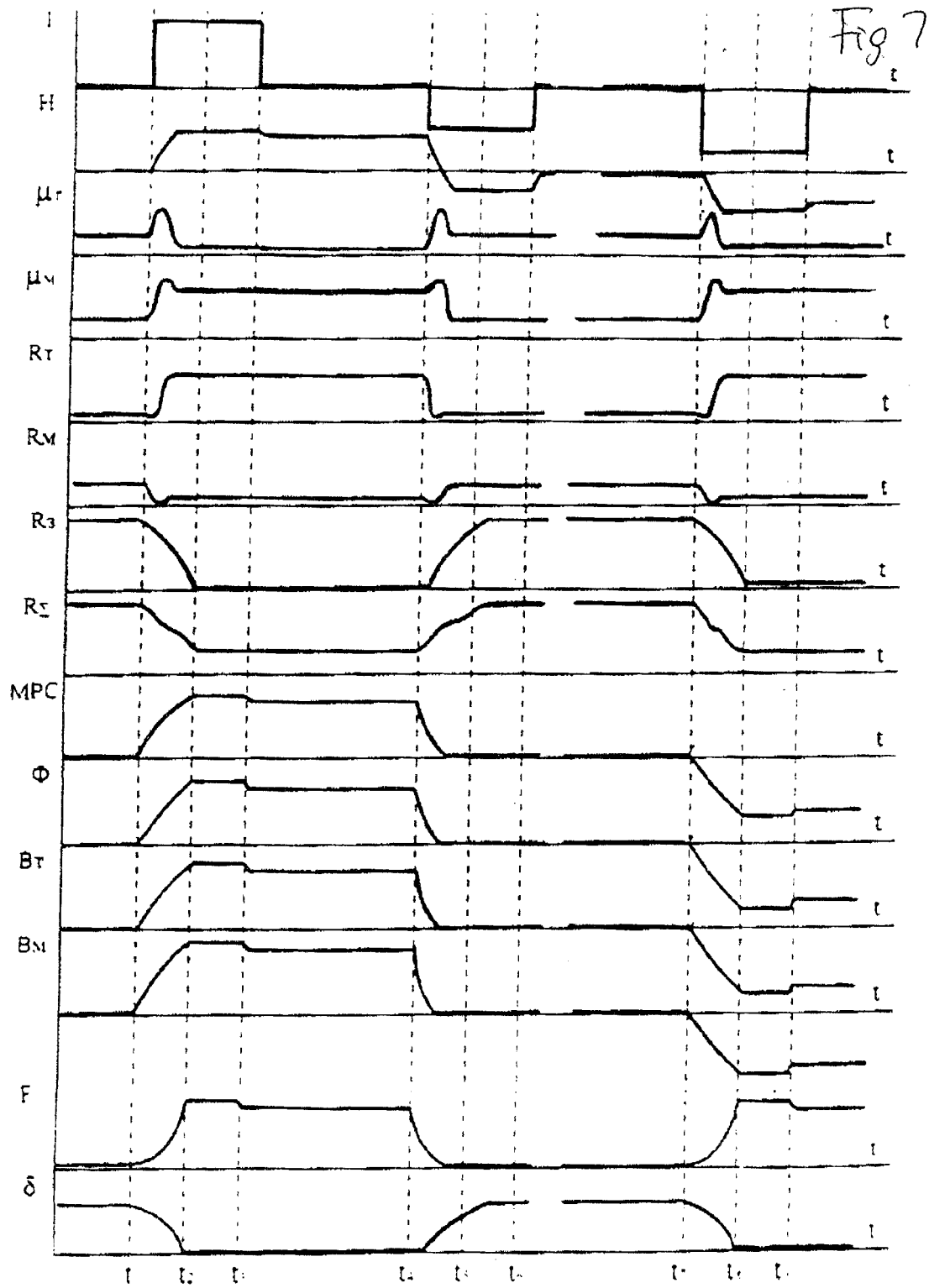

METHOD OF CONTROLLING MAGNETIC FLUX OF ELECTROMAGNET, AND ELECTROMAGNET IMPLEMENTING THE SAME

BACKGROUND OF THE INVENTION

The present invention relates to magnetic systems, and in particular to a method of controlling a magnetic flux of an electromagnetic, and also to constructions of an electromagnet which implement the method.

The proposed group of inventions can be used preferably in executing devices of electromechanical art, in particular in magnetic triggers, locking devices for blocking locks of safe boxes, automobiles, doors, etc. for preventing unauthorized penetration. In such constructions an electromagnet which performs the function of an electromechanical drive includes a magnetizing coil with a magnetic guide of a ferromagnetic material with at least one air gap. When a pulse of electric current is supplied to a winding of the magnetizing coil of ferromagnetic material of the magnetic guide, a magnetic flux which is generated in the magnetic guide attracts a movable armature. When the pulse signal of electric current is removed from the winding of the coil, the magnetic flux disappears, and as a result a holding force of the armature disappears as well, and then the armature is returned to an initial position under the action of a return spring.

A method of controlling a magnetic flux of an electromagnet with a relay characteristic is known, which is characterized by at least two stable levels of values of the magnetic flux in the magnetic guide, by supplying control pulses of electric current into the winding of a magnetizing coil with the possibility of obtaining an attracting force of the movable part of the magnetic guide (its armature), which is realized in an electromagnet with at least one air gap as disclosed for example in the German patent document DE 19639548 A1.

The known method is not sufficiently effective due to a high energy consumption, since the winding of the coil is always under current during its excitation and remains in this condition until the controlling pulse signal is removed. Moreover, the known method is relatively insufficiently effective due to a high number of emergency failures during the use, that are connected with failures of windings of the magnetizing coil which is always under current in an excited condition.

A method of controlling a magnetic flux of an electromagnet with a relay characteristic which is the closest for its technical subject matter and achieved results to the inventive method is characterized by at least two stabile levels of values of the magnetic flux in the magnetic guide, by supplying controlling pulses of electric current into the winding of the magnetizing coil with the possibility of obtaining an attracting force of a movable part of the magnetic guide (its armature) and which is realized in an electromagnet with at least one air gap is disclosed for example in the European patent document EP 0779454. in the known method of controlling a magnetic flux of an electromagnet, the above mentioned disadvantages are partially eliminated. However, the efficiency of the known method is still low for the same reasons.

The construction of the known electromagnet does not have a closed metal structure. As a result of this, its efficiency is reduced due to high magnetic flux of dissipation. Moreover, the construction of the known electromagnet does not have the property of a magnetic memory, since it does not provide the possibility of remagnetization of magnetically hard and magnetically soft materials of the magnetic guide. Therefore the known electromagnet does not provide a possibility of realizing the method of efficient control of the magnetic flux with two short-term pulses of different polarities in accordance with the principle "turned on-turned off".

A known electromagnet which is closest as to its subject matter and achieved results to the present invention is an electromagnet of an electromagnetic drive of an executing device, preferably a magnetic trigger (contactor) which realizes the method of controlling a magnetic flux in a magnetic guide, in which a winding of the magnetizing coil is arranged with a movable armature and which has at least one air gap, wherein at least a part of the magnetic guide is formed as an insert of a magnetically hard material disclosed for example in the European patent document EP 07794540.

In the construction of the known electromagnet, a part of the armature is composed of a magnetically hard material, and the magnetic guide during the operation of the electromagnet forms a three dimensional closed metallic structure, so that losses of a magnetic flux due to dissipation are reduced. However, the efficiency of the known electromagnet is insufficient because the permanent magnet which is used in its magnetic guide is arranged with a rigid marking of the magnetic poles, and during the operation of the electromagnet the part of its magnetic guide which is composed of a magnetically hard material does not remagnetize. As a result, the magnet guide of this known electromagnet does not have the property to obtain a magnetic memory. In other words when there is no current pulse in the winding of the magnetizing coil, the magnetic flux in the magnetic guide of the known electromagnet practically is absent. In any event, it is insufficient for providing a required force of attraction and holding the armature. Therefore, the known electromagnet has the above mentioned disadvantages and in particular a high energy consumption, insufficient reliability during use, insufficient functionality.

SUMMARY OF THE INVENTION

Accordingly, it is an object of the present invention to provide a method of controlling magnetic flux of an electromagnet, and an electromagnet implementing the same, which avoids the disadvantages of the prior art.

More particularly, it is an object of the present invention to provide a method of controlling a magnetic flux of an electromagnet, and an electromagnet implementing the same, in which controlling the magnetic flux of the electromagnet guide is improved and the construction of the electromagnet is improved due to a formation of a three dimensional closed metallic structure of the magnetic guide with the possibility of remagnetization of the material of the magnetic guide and obtaining the property of a magnetic memory, so that the operational efficiency is increased due to the increase of energy storage, due to reduction of number of failures, due to increase of work time before the failure, and also due to increase of functionality or in other words expansion of functional possibilities.

In keeping with these objects and with others which will become apparent hereinafter, one feature of the present invention resides, briefly stated, in a method of controlling a magnetic flux of an electromagnet with a relay pulling characteristic, characterized by at least two stabile levels of values of a magnetic flux in a magnetic guide, with a supply of controlling pulses of electric current into a winding of a magnetizing coil with obtaining a pulling force of a moving part of a magnetic guide of the electromagnet at least with one air gap, the method comprising the steps of forming the magnetic guide at least partially of a magnetically hard material which has a property to maintain at least two stabile conditions of magnetization; using as the controlling pulses two short-term pulses having an opposite polarity and supplied into the magnetizing coil on the magnetic guide of the electromagnet; with the supply of a first pulse providing a closing of a magnetic circuit and minimization of magnetic resistance of the magnetic guide due to minimization of the air gap of the magnetic guide with subsequent maximization of the magnetic flux and the magnetic guide with its transfer to one of the stable conditions characterized by a maximum value of an magnetic flux in the magnetic guide which corresponds to an energy of the controlling pulse action, with a possibility of maintaining the magnetic guide of the electromagnet in this stable condition, and providing its holding or attracting force until a supply of a second controlling pulse of electric current of the opposite polarity whose energy characteristic has a value sufficient for transferring the magnetic guide into a second stabile condition which is characterized by a different value of the magnetic flux and a different value of the holding or attracting force.

A next feature of the present invention resides in performing the supply of the first controlling pulse of current into a winding of the magnetizing coil with a subsequent maximization of the magnetic flux into the winding of the magnetizing coil with a subsequent maximization of the magnetic flux in the magnetic guide, until minimization of the air gap.

A next feature of the present invention resides in a supply of the first controlling pulse into the winding of the magnetizing coil with a subsequent maximization of the magnetic flux in the magnetic guide, until minimization of the air gap.

A next feature of the present invention resides in providing a value of a controlling action of the magnetic flux in the magnetic guide of the electromagnet caused by the first controlling pulse of electric current in the winding of the magnetizing coil of the electromagnet before closing of a magnetic circuit of the magnetic guide at a level of its optimal value which is necessary for forming a working pulling force of the electromagnet and maintaining it at said level until an elimination of the air gap and magnetization of the material of the magnetic guide, and then removing a pulse voltage from the winding of the magnetizing coil; and providing the holding pulling force of the electromagnet due to a magnetic memory of the material of the magnetic guide and the possibility of obtaining a holding force whose value corresponds to substantially 0.96 of a maximum value of the holding force of the electromagnet, created by the winding of the magnetizing coil.

A next feature of the present invention resides in providing a required power of the controlled pulses with a possibility of providing necessary pulling or holding force of the electromagnet by changing parameters of the controlling pulses selected from the group consisting of an amplitude of a pulse, a length of a pulse, a shape of a pulse, and a combination thereof.

A next feature of the present invention resides in supplying into the magnetizing coil the second controlling pulse with a different lower energy characteristic when compared with the characteristic of the first controlling pulse; and providing a transition of the magnetic guide into one of two stabile conditions which is a third stabile condition charac-terized by a corresponding value of the magnetic flux in the magnetic guide and a corresponding value of holding or attracting force.

A next feature of the present invention resides in providing a transition of the magnetic guide into a stabile condition which is characterized by a value of the magnetic flux and the magnetic guide equal to zero by supplying into the winding of a magnetizing coil a controlling current pulse which provides an intensity of the magnetic field in the magnetic guide equal to a coersitive force on a magnetizing curve of the material of the magnetic guide and the corresponding value of the holding and attracting force.

A next feature of the present invention resides in selecting one of stabile conditions of the magnetic guide as an initial condition which is characterized by a magnetic force with a value equal to an initial value and a corresponding attracting or holding force.

A next feature of the present invention resides in selecting a length $t_1$ of the first controlling pulse in the winding of the magnetizing coil and in correspondingly a magnetic flux in the magnetic guide of the electromagnet of a direct polarity and a length $t_2$ of the controlling pulse of an opposite polarity so as not to exceed a three times time constant T of a transition process for a mass of a movable part of the magnetic guide in accordance with the formula $t_1=<3T$ and $t_2=<3T$, wherein T is a time constant of the transition process.

A next feature of the present invention resides in selecting a length $t_2$ of the second controlling pulse of an opposite polarity approximately by an order less than a length $t_1$ of the first controlling pulse of a direct polarity in accordance with the formula $t_2=(1/5-1/15)t_1$.

A next feature of the present invention resides in using as the first controlling pulse of electric current in the winding of demagnetizing coil a pulse formed as a series of periodically modulated pulses with an amplitude and an enveloping line which increase from a zero value.

A next feature of the present invention resides in selecting as the second controlling pulse of electric current in the winding of the magnetizing coil a pulse formed as a series of periodically modulating pulses with an amplitude and an enveloping line which reduces to a zero value.

A next feature of the present invention resides in an electromagnet of an electromagnetic drive of an executing device, comprising a magnetic guide having a movable armature and at least one air gap; a magnetizing coil provided on said magnetic guide, said magnetic guide having at least a part formed as an insert of a magnetically hard material, said magnetic guide has a removable part formed as a cylinder, said movable armature is formed as a cover of said cylinder with a rod, said magnetizing coil is located inside said cylinder coaxially to the latter, said rod extending along an axis of said cylinder and is located in an inner hollow of said cylinder, and parts of said rod are composed of a magnetically hard material, said armature is formed so as to close said magnetic guide with formation of a three dimensional closed structure including said cylinder, said cover, said rod with a possibility of providing a holding force which is equal to a pulling force formed by a winding of said magnetizing coil during a supply of a short-term current pulse to the winding of said magnetizing coil and demagnetization of a material of said rod.

A next feature of the present invention resides in an electromagnet of an electromagnetic drive of an executing device, comprising a magnetic guide with a movable armature with at least one air gap; a magnetizing coil provided in said magnetic guide, said magnetic guide having at least a part formed as an insert of a magnetically hard material, said magnetic guide formed as two three-prong parts, arranged so that a winding of said magnetizing coil is arranged on a middle prong of one of said parts, said magnetically hard material is arranged on a middle prong of the other of said parts and is formed with a possibility of generating a magnetic flux which attracts said movable part of said magnetic guide to an immovable part when a short term pulse of electric current is supplied into the winding of said magnetizing coil and of forming a three dimensional closed structure and magnetizing of said magnetically hard material which is selected so that after stopping the supply of the pulse said magnetically hard material provides a holding force equal to a pulling force created by said magnetizing coil, while a removal of the holding force is provided by a short-term supply of a pulse of an opposite polarity into the winding of said magnetizing coil.

A next feature of the present invention resides in an electromagnet of an electromagnet drive of an executing device, comprising a magnetic guide with a movable armature and at least one air gap; a magnetizing coil provided on said magnetic guide; at least a part of said magnetic guide being formed as an insert of a magnetically hard material, said magnetic guide having a movable and an immovable part, said immovable part forming a stator of said magnetic guide and includes a base formed as a steel plate with at least two inserts composed of a magnetic material arranged on said plate and said magnetizing coil arranged on said plate; normally close contacts introduced into a power supply circuit of windings of said coil, said base having an opening in said center; a pusher for turning over of said contacts extending through said opening, said movable part of said magnetic guide being formed as an armature of said magnetic guide and formed as a steel plate with at least two rods mounted on it; a cylindrical cup provided with said pusher for changing over said contacts located in a center of said movable plate; and at least one return spring.

A next feature of the present invention resides in an electromagnet of an electromagnetic drive of an executing device, comprising a magnetic guide having a movable armature of at least one air gap; a magnetizing coil arranged on said magnetic guide, wherein a part of said magnetic guide being formed as an insert of a magnetically hard material, said magnetic guide including a housing formed as a disc; at least one horseshoe-shaped magnetic system arranged on said disc and having a coaxially arranged walls; said at least one magnetizing coil being arranged in said housing; at least one demagnetizing coil arranged on said housing, said armature of said magnetic guide being provided with a rectangular head and a return spring being formed so as to be movable along a shape passage extending along a circular arc, said passage having a bottom, said insert of said magnetically hard material being arranged on said bottom and attached to a wall of said housing.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 7 is a view showing time diagrams of parameters which characterize the processes in the electromagnet in accordance with the present invention.

DESCRIPTION OF THE PREFERRED EMBODIMENTS

Figure 1:
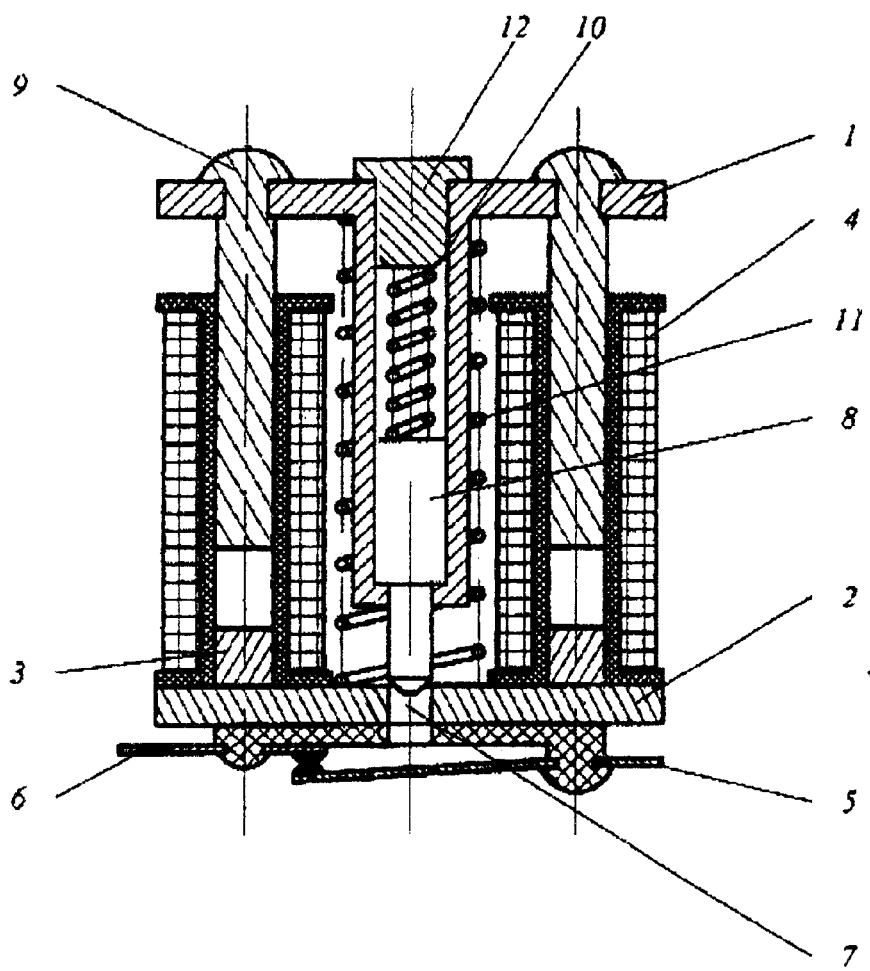
FIG. 1 is a view showing an electromagnet with a linear movement of an armature, in a longitudinal cross-section from a front side, in accordance with the present invention.
Figure 2:
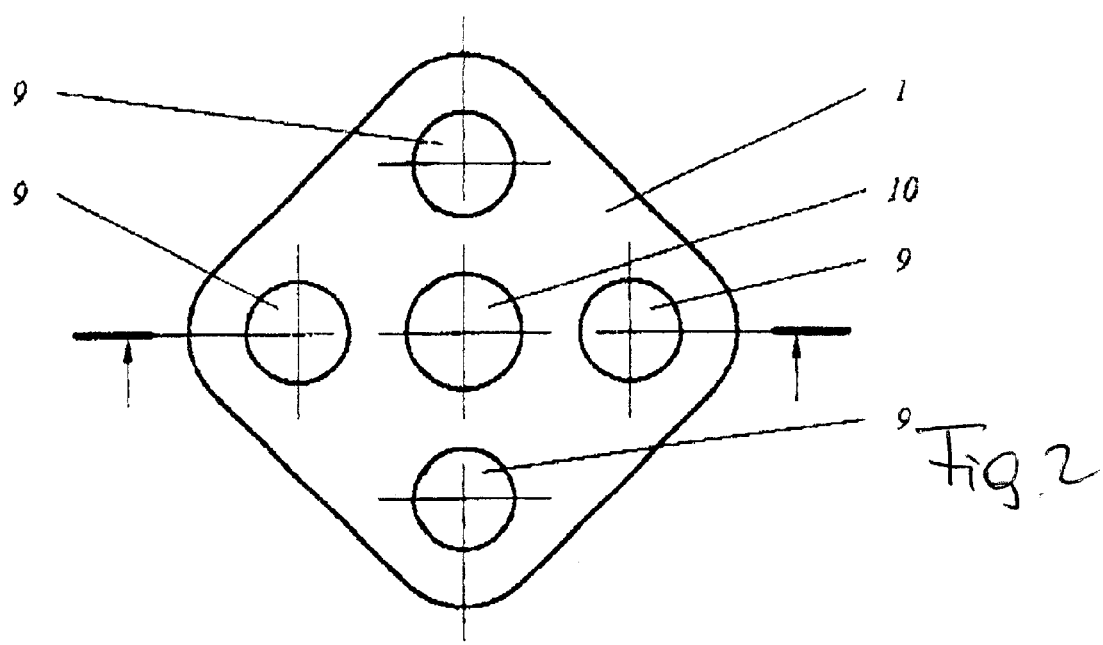
FIG. 2 is a view showing an electromagnet with a linear movement of an armature, as viewed from above, in accordance with the present invention.

A magnetic guide of an electromagnet in accordance with the present invention shown in FIGS. 1 and 2 includes a movable part 1 and an immovable part 2. The movable part 2 which forms a stator of the magnetic guide includes a base formed as a steel plate with at least two inserts 3 composed of a magnetically hard material and magnetizing coils 4 arranged on it. It further has normally closed contacts 5 and 6 for turning a winding the magnetizing coil 4. An opening 7 is formed in the center of the base for passage of a pusher 8 for turning off the contacts. The movable part 1 which forms an armature of the magnetic guide is formed as a steel plate with at least two rods 9 attached to it. A cylindrical cup 10 is arranged in the center of the movable plate and has a pusher 8 for turning off the contacts 5 and 6. It is provided with at least one return spring 11 and 12. The cup is closed by a cover 13 from above.

Figure 3:
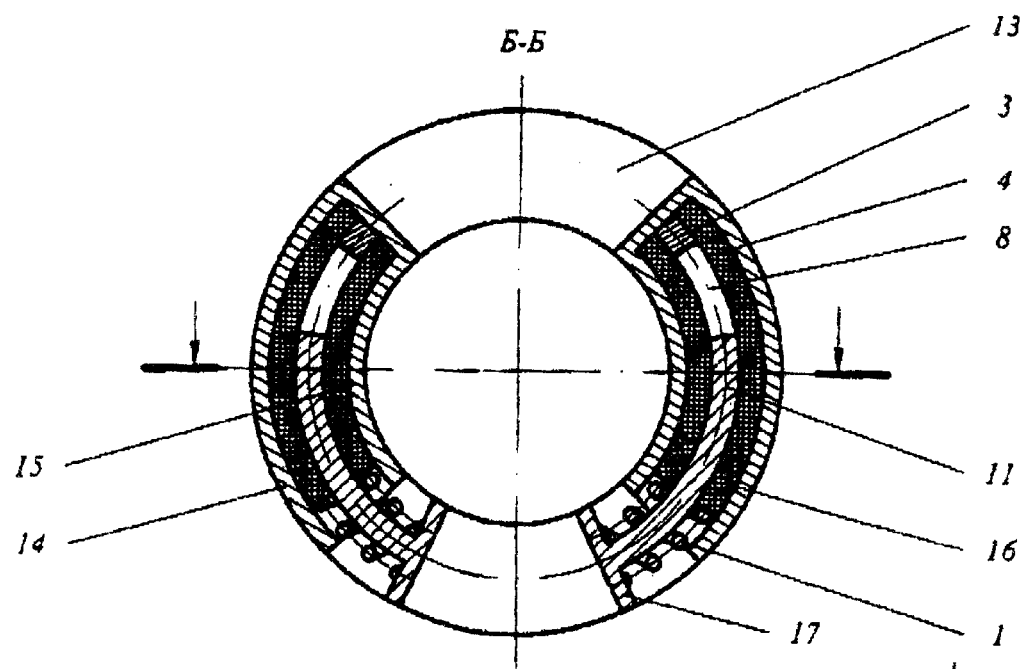
FIG. 3 is a view showing an electromagnet with a turnable displacement of an armature, in a transverse cross-section as seen from above, in accordance with the present invention.
Figure 4:
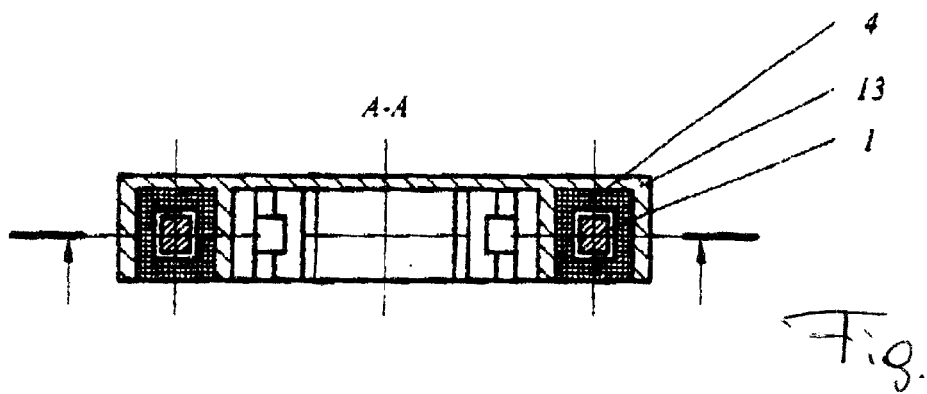
FIG. 4 is a view showing an electromagnet with a turnable displacement of an armature, in a longitudinal cross-section as seen from the front, in accordance with the present invention.

In the electromagnet of an electromagnetic drive shown in FIGS. 3 and 4, the magnetic guide includes a housing 13 formed as a disc. At least one magnetic system having a horse-shoe (segment) shape with a coaxially arranged side walls 14 and 15 is located on the housing. The housing accommodates at least one magnetizing coil 4 and at least one demagnetizing coil 16. The armature 1 of the magnetic guide is provided with a head 17 having a rectangular shape, return springs 10 and 11, and can move along a shaped passage 18 extending along a circular arc. An insert of a magnetically hard material is arranged on the bottom of the passage and fixed to the wall of the housing.

Figure 5:
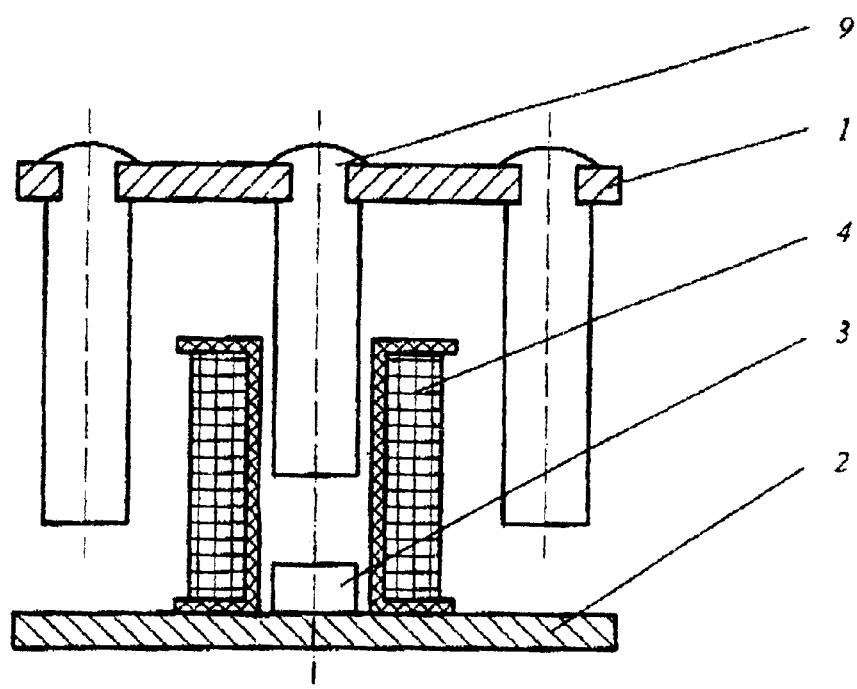
FIG. 5 is a view showing an electromagnet with a multi-rod armature, in a longitudinal cross-section as seen from the front, in accordance with the present invention.

In the electromagnet of the electromagnetic drive shown in FIG. 5, a magnetic guide is formed as a hollow steel cylinder (St3). Its part formed as an insert 3 is composed of a magnetically hard material, in particular of a samarium-cobalt alloy KSP37A (SmCo) while a movable armature 1 is formed as a cover 21 with the steel rod 9 (St3) which is located coaxially in an inner cavity 22 of a casing 23 of the magnetizing coil 4. In turn, the casing 23 is also located coaxially in an inner hollow 24 of the cylinder 2 and embraces the rod 9. The magnetic guide is formed with a possibility of a reciprocating linear movement of the rod 9 in the hollow 22 of the casing 23 and with the possibility of closing it with the cover 21 of the cylinder 2, and also with the possibility of touching by the rod 9 the insert 3 at the bottom of the cylinder 2 with a minimization of an air gap of the magnetic guide and the possibility of forming a three dimensionally closed structure (cylinder 2, cover 21, rod 9)

and magnetizing of the insert 3 of the magnetically hard material, with providing a retaining force of the electromagnet, which mainly is equal to the pulling force generated by the magnetizing coil 4.

The additional technical result which is obtained with the use of the inventive device shown in FIG. 5 resides in an increase of noise protection of the magnetic system from outer influences.

For analysis of a magnetic circuit it is convenient and accepted to use an analogy between magnetic and electrical circuits. In this case the magnetic circuits are represented as electrical diagrams which illustrate an electrical circuit analogous to the magnetic circuit, and an analysis of the analogous electrical circuits is performed.

Figure 6:
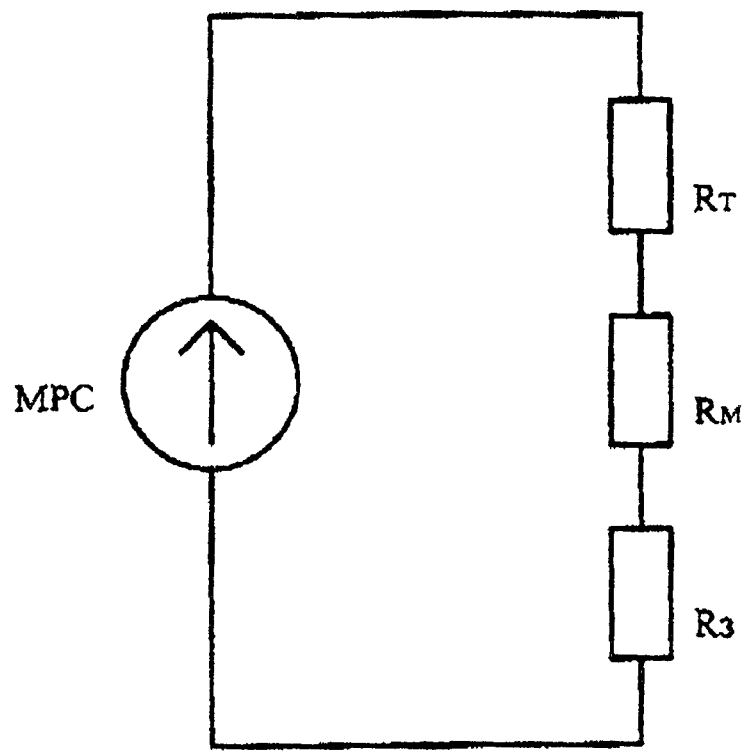
FIG. 6 is an equivalent diagram of the electromagnet in accordance with the present invention.

FIG. 6 shows an electrical diagram which represents an electrical equivalent of a magnetic circuit of the magnetic guide of the inventive electromagnet. The electromagnet, at least partially, is composed of a magnetically hard material. The analysis of the circuit is presented herein below.

In FIG. 6 a part of the magnetic guide which is formed of a magnetically hard material is illustrated as a source of the magnetic moving force MMF and the magnetic resistance $R_H$ of a magnetically hard material, while another part of the magnetic guide which is formed of a magnetically soft material is illustrated as a magnetic resistance $R_s$ of the magneto magnetically soft material. The air gap of the composite magnetic guide is represented in FIG. 6 as a magnetic resistance $R_G$ of the air gap. Then the value of the magnetic moving force is proportional to the residual of magnetization of the magnetically hard material, while the values of magnetic resistance $R_H R_S$ and $R_G$ are proportional correspondingly to a magnetic permeabilities $M_H$, $M_S$, $M_G$ of the magnetically hard material, magnetically soft material and air gap. In addition, they are correspondingly proportional to the length (length of flux lines) of the magnetically hard material, magnetically soft material and the value of the air gap. It is to be understood when the lengths (lengths of power lines) of the magnetically hard and magnetically soft materials and the value of the air gap increase, their magnetic resistance increase, and when the lengths decrease, their magnetic resistances decrease correspondingly.

FIG. 7 shows a time diagrams of parameters which characterize the physical processes in the composite magnetic guide of the device shown in FIGS. 1–5, composed at least partially of a magnetically hard material when the inventive method of controlling of the magnetic flux of the electromagnet is performed.

On the diagrams the values I(t)H(t),$\mu_H$(t), $\mu_S$(t), $R_H$(t), $R_S$(t), $R_G$(t), MMF(t), $\phi$(t), $B_H$(t), $B_S$(t), F(t), $\delta$(t), correspond to the following characteristic in dependence an time.
controlling pulses of electric current in a winding (4) of the magnetizing coil;
intensity of a magnetic field;
magnetic permeability in magnetically hard material of the magnetic guide;
magnetic permeability in magnetically soft material of the magnetic guide;
magnetic resistance of the magnetically hard material of the magnetic guide;
magnetic resistance of the magnetically soft material of the magnetic guide;
magnetic resistance of an air gap;
sum magnetic resistance of the magnetic guide;
magnetic moving force which acts in the magnetic guide;
magnetic flux in the magnetic guide;
magnetic induction in magnetically hard material of the magnetic guide;
magnetic induction in magnetically soft material of the magnetic guide;
attracting force of the electromagnet;
value of air gap in the magnetic guide.

On the time diagram I(t) a beginning of the action of the controlling pulse of the electric current in the winding of the magnetizing coil 4 is shown which starting from the time moment $T_1$ increases to its amplitude value.

The same time moment $T_1$, an increase of voltage V of the magnetic field starts to the value which is determined by the amplitude of the controlling pulse of electric current I in the winding of the magnetizing coil.

In accordance with the increase of voltage W of the magnetic field from the moment of time $T_1$, an increase of a magnetic permeability h of the magnetically hard material starts from the value µ0 to the value µmax and a subsequent increase to a minimal value caused by saturation of the magnetically hard materiel. Analogous changes occur in the magnetic permeability µS in the magnetically soft material During this process, the magnetic permeability $\mu_s$ of the magnetically soft material which does not have a pronounced saturation, increases to the value which is by 1–2 orders greater than a magnetic permeability of the magnetically hard material reaching a pronounced saturation.

The changes of the magnetic resistance $R_H$ of the magnetically hard material and the magnetic resistance $R_S$ of the magnetically soft materiel in time which represent the values inversely proportional to the corresponding magnetic permeabilities are shown on the time diagrams $R_H$(t) $R_S$(t), correspondingly.

As can be seen from the time diagrams $R_H$(t)$R_S$(t) the above mentioned magnetic resistance in a time moment $t_1$ start lowering, and this lowering continues until $R_H$ and $R_S$ reach values determined by a value of maximum magnetic permeability µmax. The magnetic resistance of the magnetically soft materiel obtains its final value which is 1–2 orders less than the magnetic resistance of the magnetically hard material.

A total magnetic resistance $R_\Sigma$ of the composite magnetic guide which is composed at least partially of a magnetically hard material can be represented as a sum of the magnetic resistances of the magnetically hard materiel $R_H$, magnetically soft material $R_S$ and air gap $R_G$ as shown in FIG. 6. The value of the magnetic resistance $R_G$ of the air gap is a function which is proportional to the value of the air gap $\delta$ end it starts reducing in a time moment $t_1$, while in the time moment $t_2$ it reaches its minimum value. In the same time moment $t_2$ the value at the magnetic resistance of the air gap $R_G$ reaches its minimal value.

The value of magnetic inductions $B_H$ in the magnetically hard material and $B_S$ in the magnetically soft materiel and the value of the magnetic flux $\phi$ in the magnetic guide, results in the value of the magnetic moving force MMF increasing from the time moment $t_1$ due to the increase of the intensity of the magnetic field V and reduction of the total magnetic resistance of the magnetic guide $R_\Sigma$. They finish their increase after finishing of the increase of intensity V of the magnetic field, after finishing of the process of magnetization of the magnetically hard and magnetically soft material, after finishing of the process of minimization of the air gap.

The attraction force F which is a function of the magnetic flux and the value of the air gap also starts increasing at the time moment $t_1$ and reaches to maximum value when the value of the air gap $\delta$ reaches its minimal value.

The above described physical variables maintain their values to the time moment $t_3$, or in other words to the moment of finishing of the action of the controlling electric current p pulse in the winding of the magnetizing coil. In this time moment $t_3$ the intensity of the magnetic field V and the magnetic moving force MMF start reducing. However, this reduction is limited by the retained magnetization of the magnetically, hard material, while the value of magnetization of the magnetically hard material in turn is limited by a low total magnetic resistance $R_Y$ of the magnetic guide which is retained due to the high intensity due to the magnetic field. Therefore, practically a known fact is maintained, or in other word the presence of a positive feedback between the above mentioned variables, while the above mentioned variables counteract their mutual decrease. This new property of the magnetic circuits which is determined by the inventor has a significant importance for the present invention, both for the method and the device in which method is supplemented.

A "catching effect" or an effect which is analogous to a "trigger effect" takes place here. As a result of the above described processes, the intensity of the magnetic field $V_I$, the value of the magnetic induction in the magnetically hard material $B_H$ and in the magnetically soft material $B_S$, the magnetic moving force MMF, the magnetic flux $\phi$, and the attraction force F retain their values at the level of 80–90% of the values which these variables had in the time moment $t_3$. The above described condition is one of stabile conditions of the magnetic guide.

This stabile condition is retained until the supply of a second controlling pulse into the winding of the magnetizing coil at the time moment $t_4$.

In this case the second controlling pulse must have an opposite, (when compared with the first controlling pulse) polarity and its value I must provide the intensity V of the magnetic field equal to a coercive force Vc of the magnetically hard material, as can be seen on the diagram V(t). On the time diagram such condition corresponds to the time moment $t_5$. Here a full demagnetization of the magnetically hard material takes place, or in other words $B_H=0$, while the magnetic permeabilities $M_H$ of the magnetically hard material and of the magnetically soft material, the magnetic resistance $R_H$ of the magnetically hard material and $R_S$ of the magnetically soft material, $R_G$ of the air gap and the total magnetic resistance $R_Y$ of the magnetic guide, magnetic inductions $B_H$ of the magnetically hard material and $B_S$ of the magnetically soft material, the magnetic flux $\phi$, the attraction force F and the value of the air gap $\delta$ are subjected to changes which in accordance with their character are opposite to the changes described in the time interval from $t_1$ to $t_2$, without consideration of the remagnetization of the ferromagnetic materials of the magnetic guides, or in other words magnetically soft material of the core and magnetically hard material of the insert.

The value of the magnetic flux $\phi=0$ and the above described values of the other parameters characterize the second stabile condition of the magnetic guide.

The time diagram I(t) shows the beginning of action at the time moment $t_7$ of the second controlling current pulse in the winding of the magnetizing coil which provides one more stabile condition of the magnetic guide analogous to the stabile condition described in the time interval from $t_3$ to $t_4$, which however has the difference in that the vector of the magnetic flux $\phi$ has a direction which is opposite to the direction in the time interval from $t_3$ to $t_4$. For obtaining this stabile condition, it is necessary to supply in the winding of the magnetizing coil a controlling pulse with a polarity opposite to the polarity in the time interval from $t_1$ to $t_2$, with an amplitude sufficient for remagnetization of the magnetically hard material. Time dependencies of the parameters shown in FIG. 7 in the time interval from $t_3$ to $t_2$ are the same as in the lime interval from $t_1$ to $t_2$ with a difference that the intensity of the magnetic field, the magnetic flux $\phi$, the magnetic inductions $B_H$ of the magnetically hard material and $B_S$ of the magnetically soft material have here the opposite polarity.

The electromagnet shown in FIGS. 1–8 in accordance with the present invention operates in the following manner:

When a pulse voltage is supplied to the winding of the magnetizing coil and a pulse current is excited in it, a magnetic flux is formed in the magnetic guide, which provides an attraction of the armature of the magnetic system to the stator, regardless of the polarity of the supplied first controlling signal. This magnetic flux provides the attraction of the armature of the magnetic system to the stator with overcoming of a force created by the return spring.

The mass of the pusher 8 for turning off the contacts 5, 6 in FIG. 1 and the force of the return spring 10 are selected so that the pusher 8, due to its inertia, in the beginning of the stroke of the armature 1 compresses the spring 10 and returns to an initial position only after closing of the circuit of the magnetic guide including "armature 1-insert 3-stator 2", with provision of turning off of the winding 4 of the magnetizing coil by the normally closed contact 5, 6 only after elimination of the air gap between the magnetically hard inserts 3 and the rods of the armature 2.

The magnetic guide provides remagnetization of the composite magnetic guide and "memorization" of the magnetic flux in a currentless condition of the winding 4 of the magnetizing coil. In particular, when there is no current in the coil the magnetic guide provides a flow of such magnetic flux which is sufficient for forming a force necessary for holding the armature in the attracted condition.

A return of the armature 1 to its initial is provided by a short-term current pulse into an oppositely wound winding, or by pulse voltage of a different polarity with a calculated amplitude, or a calculated time length in accordance with current, or by a series of reducing pulse oscillations.

The inventor confirmed by calculations and experiments that a significantly increased efficiency is provided, which includes an energy economy, a significant reduction of failures, and an increase of time of a failure free operation of commutating devices, and also in a significant expansion of functional use of the new devices.

It will be understand that each of the elements described above, or two or more together, may also find a useful application in other types of methods and constructions differing from the types described above.

While the invention has been illustrated and described as embodied in method of controlling magnetic flux of electromagnetic, and electromagnet implementing the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of controlling a magnetic flux of an electromagnet with a relay pulling characteristic, characterized by at least two stabile levels of values of a magnetic flux in a magnetic guide, with a supply of controlling pulses of electric current into a winding of a magnetizing coil with obtaining a pulling force of a moving part of a magnetic guide of the electromagnet at least with one air gap, the method comprising the steps of forming the magnetic guide at least partially of a magnetically hard material which a property to maintain at least two stabile conditions of magnetization; using as the controlling pulses two short-term pulses having an opposite polarity and supplied into the magnetizing coil on the magnetic guide of the electromagnet, with a supply of a first pulse providing a closing of a magnetic circuit and minimization of magnetic resistance of the magnetic guide due to minimization of the air gap of the magnetic guide with subsequent maximization of the magnetic flux and the magnetic guide with its transfer to one of the stabile conditions characterized by a maximum value of an magnetic flux in the magnetic: guide which corresponds to an energy of the controlling pulse action, with a possibility of maintaining the magnetic guide of the electromagnet in this stabile condition, and providing its holding or attracting force until a supply of a second controlling pulse of electric current of the opposite polarity whose energy characteristic has a value sufficient for transferring the magnetic guide into a second stabile condition which is characterized by a different value of the magnetic flux and a different value of the holding or attracting force.

2. A method as defined in claim 1; and further performing the supply of the first controlling pulse of current into a winding of the magnetizing coil with a subsequent maximization of the magnetic flux in the magnetic guide, until minimization of the air gap.

3. A method as defined in claim 1; and further comprising performing supply of the fife; controlling pulse into the winding of the magnetizing coil with a subsequent maximization of the magnetic flux in the magnetic guide, until minimization of the air gap.

4. A method as defined in claim 1; and further comprising providing a value of a controlling action on the magnetic flux in the magnetic guide of the electromagnet caused by the first controlling pulse of electric current in the winding of the magnetizing coil of the electromagnet before closing of a magnetic circuit of the magnetic guide at a level of its optimal value which is necessary for forming a working pulling force of the electromagnet and maintaining it at said level until an elimination of the air gap and magnetization of the material of the magnetic guide, and then removing a pulse voltage from the winding of the magnetizing coil; and providing the holding putting force of the electromagnet due to a magnetic memory of the material of the magnetic guide and the possibility of obtaining a holding force whose value corresponds to substantially 0.96 of a maximum value of the holding force of the electromagnet, created by the winding of the magnetizing coil.

5. A method as defined in claim 1; and further comprising providing a required power of the controlling pulses with a possibility of providing necessary pulling or holding force of the electromagnet by changing parameters of the controlling pulses selected from the group consisting of an amplitude of a pulse, a length of a pulse, a shape of a pulse, and a combination thereof.

6. A method as defined in claim 1; and further comprising supplying into the magnetizing coil the second controlling pulse with a different lower energy characteristic when compared with the characteristic of the first controlling pulse; and providing a transition of the magnetic guide into one of two stabile conditions which is a third stabile condition characterized by a corresponding value of the magnetic flux in the magnetic guide and a corresponding value of holding or attracting force.

7. A method as defined in claim 6; and further comprising providing a transition of the magnetic guide into a stabile condition which is characterized by a value of the magnetic flux and the magnetic guide equal to zero by supplying into the winding of the magnetizing coil a controlling current pulse which provides an intensity of the magnetic field in the magnetic guide equal to a coersitive force on a magnetizing curve of the materiel of the magnetic guide and the corresponding value of the holding and attracting force.

8. A method as defined in claim 1; and further comprising selecting one of stabile conditions of the magnetic guide as an initial condition which is characterized by a magnetic flux with a value equal to an initial value and a corresponding attracting or holding force.

9. A method as defined in claim 1; and further comprising selecting a length $t_1$ of the first controlling pulse in the winding of the magnetizing coil and correspondingly a magnetic flux in the magnetic guide of the electromagnet of a direct polarity and a length $t_2$ of the controlling pulse of an opposite polarity so as not to exceed a three times time constant $\tau$ of a transition process for a mass of a movable part of the magnetic guide in accordance with the formula $t_1 = \leq 3\tau$ and $t_2 = \leq \tau$, wherein tow is a time constant of the transition process.

10. A method as defined in claim 1, and further comprising selecting a length $t_2$ of the second controlling pulse of an opposite polarity approximately by an order less than a length $t_1$ of the first controlling pulse of a direct polarity in accordance with the formula $t_2 = (\frac{1}{5} - \frac{1}{15})t_1$.

11. A method as defined in claim 1; and further comprising using as the first controlling pulse of electric current in the winding of the magnetizing coil a pulse formed as a series of periodically modulated pulses with an amplitude and an enveloping line which increase from a zero value.

12. A method as defined in claim 1; and further comprising selecting as the second controlling pulse of electric current in the winding of the magnetizing coil a pulse formed as a series of periodical modulated pulses with an amplitude and an enveloping line which reduce to a zero value.

13. An electromagnet of an electromagnetic drive of an executing device, comprising a magnetic guide having a movable armature and at least one air gap; a magnetizing coil provided on sold magnetic guide, said magnetic guide having at least a part formed as an insert of a magnetically hard material, said magnetic guide having an immovable part formed as a cylinder, said movable armature being formed as a cover of said cylinder with a rod, said magnetizing coil being located in side said cylinder coaxially to the latter, said rod extending along an axis of said cylinder and being located in an inner hollow of said cylinder, and parts of said rod being composed of a magnetically hard material, said armature being formed so as to close said magnetic guide with formation of a three dimensional closed structure including said cylinder, said cover, said rod with a possibility of providing a holding force which is equal to a pulling force formed by a winding of said magnetizing coil during a supply of a short-term current pulse to the winding of said magnetizing coil and demagnetization of a material of said rod.

14. An electromagnet of an electromagnetic drive of an executing device, comprising a magnetic guide with a movable armature with at least one air gap; a magnetizing coil provided in said magnetic guide, said magnetic guide having at least a part formed as an insert of a magnetically hard material, said magnetic guide being formed as two three-prong parts, arranged so that a winding of said magnetizing coil is arranged on a middle prong of one of said parts, said magnetically hard material is arranged on a middle prong of the other of said parts and is formed with a possibility of generating a magnetic flux which attracts said movable part of said magnetic guide to an immovable part when a short term pulse of electric current is supplied into the winding of said magnetizing coil and of forming a three dimensional closed structure and magnetizing of paid magnetically hard material which is selected so that after stopping of the supply of the pulse said magnetically hard material provides a holding face equal to a pulling force created by said magnetizing coil, while a removal of the holding force is provided by a short-term supply of a pulse of an opposite polarity into the winding of said magnetizing coil.

15. An electromagnet of an electromagnet drive of an executing device, comprising a magnetic guide with a movable armature in at least one air gap; a magnetizing coil provided on said magnetic guide; at least a part of said magnetic guide being famed as an insert of a magnetically hard material, said magnetic guide having a movable and an immovable part, said immovable part forming a stator of said magnetic guide and including a base formed as a steel plate with at least two inserts composed of a magnetic material arranged on said plate and sold magnetizing coil arranged on said plate; normally closed contacts introduced into a power supply circuit of windings of said coil, said base having an opening in said center, a pusher for turning over of said contacts extending through said opening, said movable part of said magnetic guide being formed as an armature of sold magnetic guide and formed as a steel plate with at least two rods mounted on it; a cylindrical cup provided with said pusher for changing over said contacts located in a center of said movable plate; and at least one return spring.

16. An electromagnet of an electromagnetic drive of an executing device, comprising a magnetic guide having movable armature of at least one air gap; a magnetizing coil arranged on said magnetic guide, wherein said part of said magnetic guide being formed as an insert of a magnetically hard material, said magnetic guide including a housing formed as a disc; at least one horseshoe-shaped magnetic system arranged on said disc and having a coaxially arranged walls; said at least one magnetizing coil being arranged in said housing; at least one demagnetizing coil arranged on said housing, said armature of said magnetic guide being provided with a rectangular head and a return spring being formed so as to be movable along a shaped passage extending along a circular arc, said passage having a bottom, said insert of said magnetically hard material being arranged on said bottom and attached to a wall of said housing.

* * * * *